United States Patent Office 3,828,068
Patented Aug. 6, 1974

3,828,068
[(SUBSTITUTED INDAZOLYL)-N¹-METHYL]
CARBAMATES
Pasquale P. Minieri, Woodside, N.Y., assignor to
Tenneco Chemicals, Inc.
No Drawing. Continuation-in-part of applications Ser. No.
141,999, May 10, 1971, now Patent No. 3,741,979,
and Ser. No. 247,084, Apr. 24, 1972. This application
Nov. 29, 1972, Ser. No. 310,670
Int. Cl. C07d 49/18
U.S. Cl. 260—310 C                          3 Claims

ABSTRACT OF THE DISCLOSURE

Compounds that have the structural formula

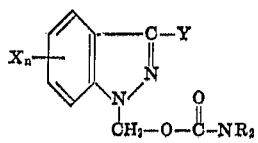

wherein X represents halogen, nitro, amino, acetamino, or (halobenzylidene)amino; $n$ represents an integer in the range of 0 to 3; each R represents hydrogen, lower alkyl, phenyl, halophenyl, or nitrophenyl; when $n$ is 0, Y represents halogen; and when $n$ is 1 to 3, Y represents hydrogen or halogen are used to control the growth of fungi and bacteria. Illustrative of these compounds is (3-chloroindazolyl-N¹-methyl)N-methylcarbamate.

---

This is a continuation-in-part of my copending application Ser. No. 141,999, which was filed on May 10, 1971, now U.S. Pat. 3,741,979, and of my copending application Ser. No. 247,084, which was filed on Apr. 24, 1972.

This invention relates to [(substituted indazolyl)-N¹-methyl]carbamates and to the use of these compounds in the control of the growth of bacteria, fungi and other microorganisms.

In accordance with this invention, it has been found that certain [(substituted indazolyl)-N¹-methyl]carbamates have unusual and valuable activity as biocides. These compounds may be represented by the structural formula

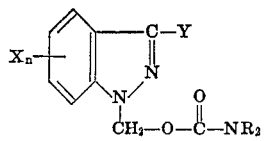

wherein X represents halogen (chlorine, bromine, fluorine, or iodine), nitro, amino, acetamino, (chlorobenzylidene)amino, (bromobenzylidene)amino, (fluorobenzylidene)amino, or (iodobenzylidene)amino; $n$ represents an integer in the range of 0 to 3; each R represents hydrogen, alkyl having 1 to 4 carbon atoms, phenyl, chlorophenyl, bromophenyl, fluorophenyl, iodophenyl, or nitrophenyl; when $n$ is 0, Y represents halogen (chlorine, bromine, fluorine, or iodine); and when $n$ is 1 to 3, Y represents hydrogen or halogen (chlorine, bromine, fluorine, or iodine).

Illustrative of these compounds are the following:

(3-chloroindazolyl-N¹-methyl)N-methylcarbamate,
(3-bromoindazolyl-N¹-methyl)N-methylcarbamate,
(3-fluoroindazolyl-N¹-methyl)N-methylcarbamate,
(3-iodoindazolyl-N¹-methyl)N,N-dibutylcarbamate,
(5,7-dichloroindazolyl-N¹-methyl)N-methylcarbamate,
(6-nitroindazolyl-N¹-methyl)N,N-diethylcarbamate,
(6-acetaminoindazolyl-N¹-methyl)N-p-bromophenylcarbamate,
[6-(chlorobenzylidene)aminoindazolyl-N¹-methyl])N-p-nitrophenylcarbamate,
(4,5,7-tribromoindazolyl-N¹-methyl)N-methyl-N-butylcarbamate,
(3-chloro-6-acetaminoindazolyl-N¹-methyl)N,N-diethylcarbamate,
(6-nitroindazolyl-N¹-methyl)N-3,4-dichlorophenylcarbamate, and the like.

Particularly effective as biocides are the compounds having the aforementioned structure in which X represents chlorine or nitro and Y represents chlorine or hydrogen. Among these preferred compounds are (3-chloroindazolyl-N¹-methyl)N-methylcarbamate,
(3,5,7-trichloroindazolyl-N¹-methyl)N-ethylcarbamate,
(3-chloro-6-nitroindazolyl-N¹-methyl)N,N-dibutylcarbamate,
(5,7-dichloroindazolyl-N¹-methyl)N,N-dimethylcarbamate,
(5,6-dinitroindazolyl-N¹-methyl)N-phenylcarbamate, and the like.

The carbamates of this invention may be prepared by any suitable and convenient procedure. For example, they may be prepared by heating an N¹-hydroxymethyl-(substituted indazole) with the appropriate isocyanate. The reaction is generally carried out in a solvent, such as benzene, toluene, acetone, or tetrahydrofuran, at the reflux temperature of the reaction.

The (substituted indazolyl-N¹-methyl)carbamates can be used to inhibit or prevent the growth of a wide variety of fungi, bacteria, and other microorganisms.

In a preferred embodiment of the invention, the novel carbamates are used to impart fungal and bacterial resistance to surface-coating compositions including both organic solvent-based and water-based coating systems. They are particularly valuable as biocides in coatings that contain as their resinous binder either an oleoresinous material or a water-insoluble synthetic linear addition polymer.

Among the surface coating compositions in which the compounds of this invention can be used as the biocide are organic solvent-based systems that contain such oleoresinous binders as drying oils, for example, linseed oil, tung oil, soybean oil, dehydrated castor oil, safflower oil, or fish oil; bodied drying oils; blends of drying oils or bodied drying oils with a resin component, such as limed rosin, ester gum, or a phenolic resin; oleoresinous varnishes formed by heating the aforementioned resins with drying oils or bodied drying oils; and alkyd resins.

The novel carbamates can also be used as the biocide in aqueous dispersions that contain about 10 percent to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically-unsaturated compounds, especially those of monoethylenically-unsaturated character, although butadiene, chloro-butadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl chloride with vinyl acetate, vinylidene chloride, acrylonitrile, methacrylic acid and methacrylic acid esters, acrylic acid and acrylic acid esters; polyethylene; polyisobutylene, polystyrene; copolymers of styrene with butadiene, acrylic acid esters, methacrylic acid esters, or maleic anhydride; and the like.

Only a small amount of the (substituted indazolyl-N¹-methyl)carbamate need be present in the surface-coating compositions. As little as 0.10 percent of one or more of these compounds, based on the weight of the composition, will bring about an appreciable improvement in the resistance of the composition to attack by microorganisms. Three percent or more can be used, but these larger amounts generally do not provide further improvement in the properties of the surface-coating compositions and for this reason are not ordinarily used. In most cases about 1 percent to 2 percent of the biocidal compound, based on the weight of the surface-coating composition, is used.

The invention is further illustrated by the examples that follow.

EXAMPLE 1

To a mixture of 18.1 grams (0.1 mole) of $N^1$-hydroxymethyl-3-chloroindazole, 1 ml. of triethylamine, and 150 ml. of tetrahydrofuran was added 6.4 grams (0.133 mole) of methyl isocyanate over a period of about 10 minutes during which time its temperature rose from 22° C. to 26° C. The reaction mixture was heated to its reflux temperature in 20 minutes and held at this temperature for 75 minutes. It was cooled and allowed to stand overnight at room temperature. It was then cooled in an ice bath and filtered. The product was dried at 60° C. under reduced pressure. There was obtained 15.6 grams of (3 - chloroindazolyl-$N^1$-methyl)N-methylcarbamate, which melted at 161°–167° C.

EXAMPLE 2

To a mixture of 19.2 grams (0.1 mole) of $N^1$-hydroxymethyl-6-nitroindazole, 1 ml. of triethylamine, and 150 ml. of tetrahydrofuran was added 24.9 grams (0.133 mole) of 3,4 - dichlorophenyl isocyanate over a period of about 10 minutes during which its temperture rose to 25° C. The reaction mixture was heated at its reflux temperature for 85 minutes, cooled, and allowed to stand overnight at room temperature. It was then cooled in an ice bath and filtered. The product was dried at 60° C. under reduced pressure. The (6-nitroindazolyl-$N^1$-methyl) N-3,4-dichlorophenylcarbamate obtained melted at 194°–6° C. (dec.) and contained 18.8% Cl (calculated, 18.6% Cl).

EXAMPLE 3

The procedure described in Example 1 was repeated using $N^1$-hydroxymethyl-5,7-dichloroindazole in place of $N^1$-hydroxymethyl - 3 - chloroindazole and ethyl isocyanate in place of methyl isocyanate. The (5,7-dichloroindazolyl - $N^1$ - methyl)N-ethylcarbamate obtained contained 22.3% Cl (calculated 24.6% Cl).

EXAMPLE 4

(A) A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| 55% aqueous dispersion of polyvinyl acetate | 350 |

(B) An acrylic paint was prepared by mixing together the following materials:

| | Parts by weight |
|---|---|
| Water | 250 |
| Acrylic acid resin (100% solids) (Acryloid B–66) | 385 |
| Monoethyl ether of ethylene glycol | 259 |
| Titanium dioxide | 143 |
| Aluminum silicate | 45 |
| Magnesium silicate | 98 |

(C) An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent (Exkin 2) | 2 |
| Manganese naphthenate (6% Mn) | 2.27 |
| Lead naphthenate (24% Pb) | 11.3 |

(D) To samples of these paints was added either 2 percent by weight of one of the compounds of this invention or 2 percent by weight of a comparative biocide.

EXAMPLE 5

Samples of the acrylic paint, the polyvinyl acetate paint, and the oil-based paint whose preparation was described in Example 4 were evaluated by the following porcedure: Pieces of drawdown paper were dipped into the paint, dried for 24 hours, and again dipped into the paint. After a 24-hour drying period, the coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28° C. and observed weekly. The results of the triplicate plates were average. In the table that follows ZO: Zone of inhibition in mm.
0: No growth; no zone of inhibition
Tr: Trace of zone of inhibition
—: Not tested Bacteria:
    A—*Bacillus subtilis*
    B—*Aerobacter aerogenes*
    C—*Pseudomonas aeruginosa*

Fungi:
    D—*Pullularia pullulans*
    E—*Penicillium crustosum*
    F—*Aspergillus niger*

The biocidal compounds tested and the results obtained are set forth in the table that follows.

TABLE

| Biocide | Paint | pH | Biocidal activity ||||||
|---|---|---|---|---|---|---|---|---|
| | | | Bacteria ||| Fungi |||
| | | | A | B | C | D | E | F |
| Product of Example 1 | Acrylic | 9.3 | Tr | 0 | 0 | 0 | 0 | ZO-7 |
| | PVA | 7.4 | 0 | 0 | 0 | 0 | 0 | 0 |
| | Oil | | — | — | — | 0 | 0 | 0 |
| Product of Example 2 | Acrylic | 8.9 | 0 | 0 | 0 | ZO-1 | ZO-2 | Tr |
| | PVA | 8.7 | 0 | 0 | 0 | ZO-2 | 0 | 0 |
| | Oil | | — | — | — | 0 | 0 | 0 |
| Bis(phenylmercury)dodecenylsuccinate (Super Ad-it) | Acrylic | 8.4 | ZO-9 | ZO-6 | ZO-6 | ZO-10 | ZO-1 | ZO-10 |
| | PVA | 6.9 | ZO-10 | ZO-2 | ZO-7 | ZO-10 | ZO-6 | ZO-8 |
| | Oil | | — | — | — | ZO-10 | ZO-4 | ZO-10 |

Each of the other [(substituted indazolyl)-$N^1$-methyl] carbamates disclosed herein can be used in a similar way to protect surface-coating compositions from deterioration resulting from attack by fungi and bacteria.

What is claimed is:

1. A compound having the structural formula

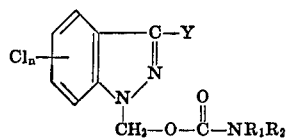

wherein $R_1$ represents hydrogen or alkyl of 1 to 4 carbon atoms; $R_2$ represents alkyl of 1 to 4 carbon atoms; $n$ represents an integer in the range of 0 to 3; when $n$ is 0, Y represents halogen; and, then $n$ is 1 to 3, Y represents hydrogen or halogen.

2. The compound as defined in Claim 1 that is (3-chloroindazolyl-$N^1$-methyl) N-methylcarbamate.

3. The compound as defined in Claim 1 that is (5,7-dichloroindazolyl-$N^1$-methyl) N-ethylcarbamate.

References Cited

FOREIGN PATENTS

| 1,816,740 | 8/1969 | Germany | 260—310 C |
| 1,568,790 | 4/1969 | France | 260—310 C |

NATALIE TROUSOF, Primary Examiner

U.S. Cl. X.R.

106—15 R, 15 AF, 18; 260—29.6 MN, 89.1; 424—273

UNITED STATES PATENT OFFICE
CERTIFICATE OF CORRECTION

Patent No. 3,828,068                              Dated Aug. 6, 1974

Inventor(s) Pasquale P. Minieri

It is certified that error appears in the above-identified patent and that said Letters Patent are hereby corrected as shown below:

Column 6, line 1, change "then" to -- when --.

Signed and sealed this 7th day of January 1975.

(SEAL)
Attest:

McCOY M. GIBSON JR.                C. MARSHALL DANN
Attesting Officer                  Commissioner of Patents